(12) United States Patent
Bennett

(10) Patent No.: US 7,570,631 B2
(45) Date of Patent: Aug. 4, 2009

(54) CABLE TELEPHONY NETWORK SUPPORTING ROAMING VOIP TERMINALS

(75) Inventor: James D. Bennett, San Clemente, CA (US)

(73) Assignee: Broadcom Corporation, Irvine, CA (US)

(*) Notice: Subject to any disclaimer, the term of this patent is extended or adjusted under 35 U.S.C. 154(b) by 90 days.

(21) Appl. No.: 11/417,453

(22) Filed: May 4, 2006

(65) Prior Publication Data

US 2007/0201688 A1 Aug. 30, 2007

Related U.S. Application Data

(63) Continuation-in-part of application No. 11/348,962, filed on Feb. 7, 2006, and a continuation-in-part of application No. 11/348,814, filed on Feb. 7, 2006, and a continuation-in-part of application No. 11/348,743, filed on Feb. 7, 2006, and a continuation-in-part of application No. 11/386,586, filed on Mar. 22, 2006.

(51) Int. Cl.
*H04L 12/66* (2006.01)

(52) U.S. Cl. ................. 370/352; 379/156; 379/196; 379/201.01

(58) Field of Classification Search ............. 370/352; 379/156, 196, 201.01
See application file for complete search history.

(56) References Cited

U.S. PATENT DOCUMENTS

| 2005/0013421 A1* | 1/2005 | Chavez et al. ............ 379/93.09 |
| 2006/0050686 A1* | 3/2006 | Velez-Rivera et al. ....... 370/352 |
| 2006/0085832 A1* | 4/2006 | Groff et al. .................. 725/106 |
| 2006/0099934 A1* | 5/2006 | Song et al. ............... 455/412.2 |

* cited by examiner

*Primary Examiner*—Quynh H Nguyen
(74) *Attorney, Agent, or Firm*—Garlick Harrison & Markison

(57) ABSTRACT

A cable infrastructure includes a plurality of cable modem circuits communicatively coupled to a cable network and associated with a corresponding one of a plurality of subscribers. Each of a plurality of telephones has both a POTS (Plain Old Telephone System) interface and a unique telephone number and associates with a corresponding one of the plurality of subscribers. Each of a plurality of interface circuits couples one of the plurality of cable modem circuits with a corresponding one of the plurality of telephones via the POTS interface. A head end system communicatively couples to the cable network, the public switched telephony network, and the Internet network and supports address mapping that enables communication exchanges between one of the plurality of telephones and an Internet telephony device. The address mapping also enables communication exchanges between telephones serviced by differing head ends via an Internet pathway that is independent of the public switched telephony network.

12 Claims, 8 Drawing Sheets

US 7,570,631 B2

CABLE TELEPHONY NETWORK SUPPORTING ROAMING VOIP TERMINALS

CROSS REFERENCES TO RELATED APPLICATIONS

This application is a continuation-in-part of the following co-pending applications:

1. Utility application Ser. No. 11/348,962, filed on Feb. 7, 2006, and entitled "TELEPHONE SUPPORTING BRIDGING BETWEEN A PACKET SWITCHED NETWORK AND THE PUBLIC SWITCHED TELEPHONE NETWORK";

2. Utility application Ser. No. 11/348,814, filed on Feb. 7, 2006, and entitled "COMPUTING DEVICE SUPPORTING BRIDGING BETWEEN A PACKET SWITCHED NETWORK AND THE PUBLIC SWITCHED TELEPHONE NETWORK";

3. Utility application Ser. No. 11/348,743, filed on Feb. 7, 2006, and entitled "SET TOP BOX SUPPORTING BRIDGING BETWEEN A PACKET SWITCHED NETWORK AND THE PUBLIC SWITCHED TELEPHONE NETWORK"; and 4. Utility application Ser. No. 11/386,586, filed on Mar. 22, 2006, and entitled "SERVICE EXCHANGE IN A VOIP TO TELEPHONY BRIDGING NETWORK", all of which are incorporated herein in their entirety for all purposes.

BACKGROUND OF THE INVENTION

1. Technical Field of the Invention

This invention relates generally to communication systems and more particularly to Voice over Internet Protocol (VoIP) telephony and to Public Switched Telephone Network (PSTN) telephony.

2. Description of Related Art

Voice telephony has been known for many years. Initially, dedicated conductors between telephones supported voice telephony. Then, operators manually switching connectors to create and tear down circuits between telephones enabled voice telephony. As technology advanced, mechanical components performed the switching operations to create and tear down circuits between telephones. With advancing technology, computers and semiconductor components replaced the mechanical components to perform circuit-switching duties. Networks created using this circuit-switched technology are generally known as the Public Switched Telephone Network (PSTN). Generally, the PSTN provides a circuit-switched, time-divided connection between telephones.

Packet data communications, such as those supported by the Internet, differ from circuit-switched communications. With packet data communications, a source device forms a data packet, transmits the data packet to a packet data network, and based upon a destination address, e.g., Internet Protocol (IP) address of the data packet, the packet data network passes the data packet to a destination device. As the Internet and other packet data networks grew in popularity, packet switched voice telephony was developed. One common type of packet switched voice telephony is Voice over Internet Protocol (VoIP) telephony. When VoIP telephony was first introduced, the data packet transmission latency of the Internet and of other servicing networks caused the quality of VoIP telephony to be significantly worse than that of PSTN telephony. Over time, packet data transmission latency of the Internet and of other servicing packet data networks has decreased. Now, VoIP telephony provides service quality equal to or better than VoIP telephony in many cases.

Recently developed VoIP telephony applications enable computer users to establish non-toll VoIP telephone calls across the Internet. Compared to PSTN telephony VoIP telephony of this type is significantly less expensive, particularly for overseas calls. However, only a limited number of people have a computer upon which this VoIP telephony application may be loaded and have Internet access of a quality that will support the VoIP telephony application.

In order to gain some advantages of VoIP telephony but still service consumers having PSTN telephones, VoIP telephony service providers typically deploy VoIP gateways. The VoIP gateways bridge communications between the PSTN (PSTN telephony call) and the Internet-(VoIP telephony call). VoIP telephony service providers typically extract a toll for servicing a call via the VoIP gateway bridge, thus destroying in part the low cost attractiveness of VoIP telephony.

Alternatives to traditional telephone network now exist that include wireless local loop and cable modem network telephone service, for example. Cable modem network telephone service systems deploy cable modems at subscriber locations. These cable modems couple to both subscriber telephones and to a cable network. A telephone service provider deploys a head unit that couples to the cable network and to the PSTN. The combination of a cable modem, the cable network, and the head unit intercouples a subscriber's telephone to the PSTN. Due to aggregation efficiencies, the cable modem network service provider can typically provide attractive rates to the subscribers, as compared to a telephone company. However, difficulties exist with such systems due to the non-local PSTN access of telephones, e.g., 911 call servicing, that make these systems unattractive from other standpoints. Thus, a need exists for systems and methods of operations that overcome the shortcomings of these prior telephony systems.

BRIEF SUMMARY OF THE INVENTION

The present invention is directed to apparatus and methods of operation that are further described in the following Brief Description of the Drawings, the Detailed Description of the Drawings, and the Claims. Other features and advantages of the present invention will become apparent from the following detailed description of the invention made with reference to the accompanying drawings.

DETAILED DESCRIPTION OF THE INVENTION

Figure 1:
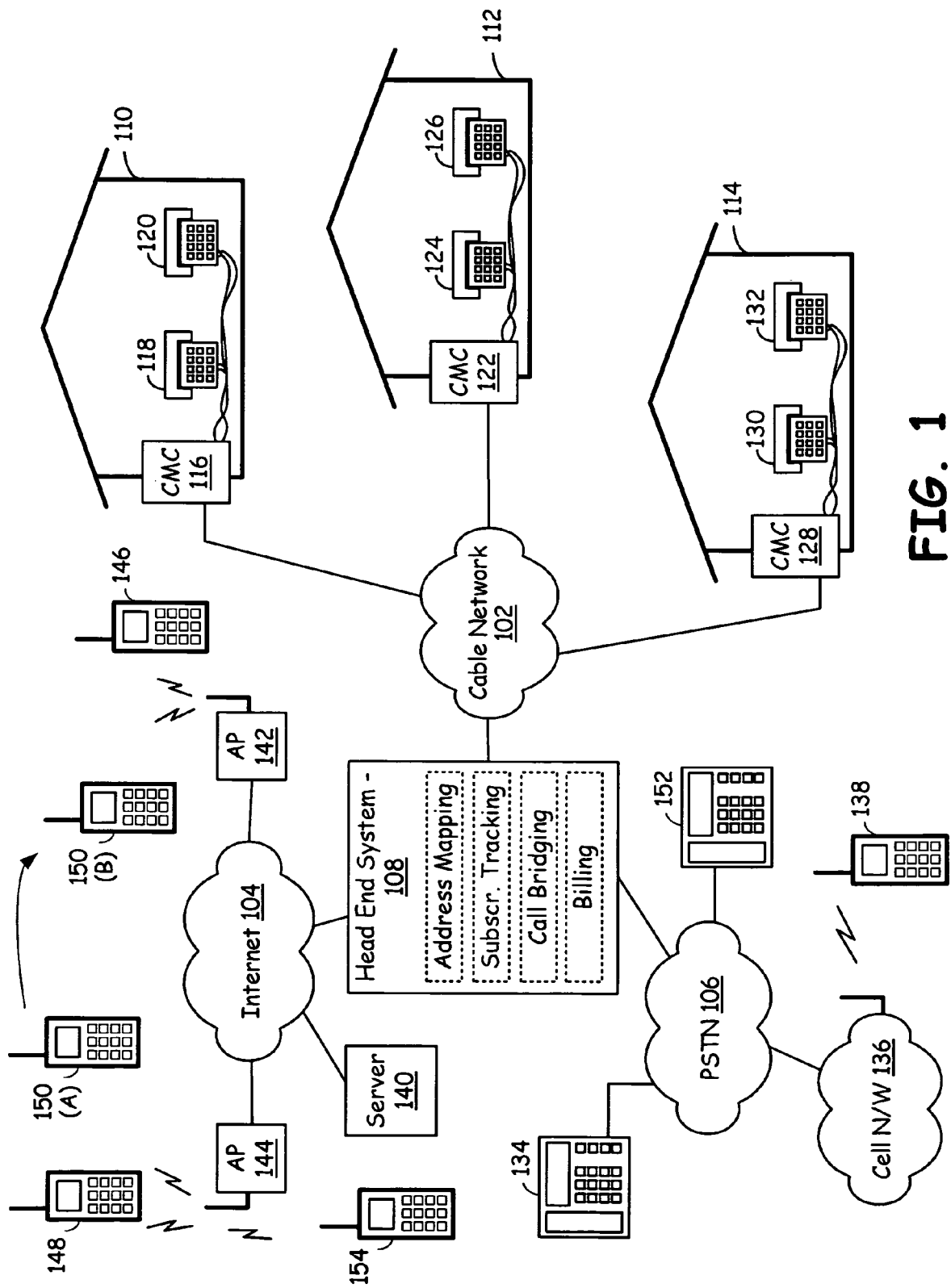
FIG. 1 is a system diagram illustrating a cable infrastructure constructed according to an embodiment of the present invention.

FIG. 1 is a system diagram illustrating a cable infrastructure constructed according to an embodiment of the present invention. The cable infrastructure of FIG. 1 is formed and operates in conjunction with a communication infrastructure that includes the Public Switched Telephony Network (PSTN) 106 and the Internet 104. As generally known, the PSTN supports PSTN telephony while the Internet supports Voice over Internet Protocol (VoIP) telephony. The cable infrastructure services a plurality of subscribers and includes a cable network 102, a plurality of cable modem circuits 116, 122, and 128, a plurality of telephones 118, 120, 124, 126, 130, and 132, and a head end system 108. Each of the plurality of telephones 118, 120, 124, 126, 130, and 132 may be a Plain Old Telephone System (POTS) telephone and support a POTS interface. However, with other embodiments of the present invention, these telephones 118, 120, 124, 126, 130, and 132 support a digital interface or another type of interface. These telephones 118, 120, 124, 126, 130, and 132 will be referred to hereinafter interchangeably as POTS telephones, telephones, and voice terminals. A plurality of interface circuits may be included within or reside separate from the plurality of cable modem circuits 116, 122, and 128 and service the plurality of telephones 118, 120, 124, 126, 130, and 132.

Each of a plurality of premises 110, 112, and 114 corresponds to one or more respective subscribers and a respective cable modem circuit, a respective interface circuit, and one or more telephones. Premises 110 corresponds to cable modem circuit 116, an interface circuit (not explicitly shown), and POTS telephones 118 and 120. The cable modem circuit 116 and the interface circuit support POTS telephones 118 and 120. The POTS telephones correspond to a shared PSTN number or unique respective PSTN numbers. Each of the plurality of telephones 118 and 120 are associated with a corresponding subscriber or with multiple subscribers. The subscriber associated with telephones 118 and 120 may be the owner/renter/operator of premises 110. Premises 110 may be home, an office, a warehouse, or another locale.

Premises 112 has associated therewith cable modem circuit 122, interface circuit (not shown), and telephones 124 and 126. Premises 114 has associated therewith cable modem circuit 128, interface circuit (not shown), and telephones 130 and 132. The plurality of interfaces included with the cable infrastructure each communicatively couple one of the plurality of cable modem circuits 116, 122, and 128 with one or more corresponding telephones of the plurality of telephones via their respective POTS interfaces. Thus, for example, within premises 112, an interface circuit included with the cable modem circuit 122 communicatively couples to telephones 124 and 126 via twisted pair wiring.

The head end system 108 communicatively couples to the cable network 102, the PSTN 106, and the Internet 104. The cable network 102 includes coaxial cabling, optical cabling, wired cabling, and/or wireless connection(s) that communicatively couples the head end system 108 to the cable modem circuits 116, 122, and 128. One type of interface supported by the head end system 108 and the cable modem circuits 116, 122, and 128 of FIG. 1 is the Data Over Cable System Interface Specification (DOCSIS). DOCSIS describes the manner in which the head end system 108 communicates with the plurality of cable modem circuits 116, 122, and 128. The cable infrastructure of the present invention may support DOCSIS in a standard format or in a modified format. Alternately, operations of the present invention may proceed according to a proprietary communication format.

According to the present invention, the head end system 108 supports address mapping, subscriber tracking, call bridging, and billing. As will be described further herein, the head end system 108, cable modem circuit 116, 122, and 128, and associated interface circuit supports these operations for the plurality of subscribers and for the plurality of telephones 118, 120, 124, 126, 130, and 132.

According to a one operation of the cable infrastructure of FIG. 1, a VoIP terminal 146 seeks to place a call to telephone 124 that is located within premises 112. In doing so, the VoIP terminal 146 first determines an Internet Protocol (IP) address of the head end system 108 and/or an IP address of the cable modem circuit 122 that services the telephone 124. In one particular operation, the VoIP terminal 124 locally stores a mapping between a PSTN number of the telephone 124 and an IP address of the head end system 108 and/or an IP address of the cable modem circuit 124 and accesses the mapping information directly. In an alternate operation, the VoIP terminal 124 accesses a server 140 that services a mapping between the PSTN number of telephone 124 and the IP address of the head end system 108 and/or the IP address of the cable modem circuit 124. In still another operation, the VoIP terminal 146 accesses the head end system 108 using a general access IP address of the head end system 108 and the head end system 108 maps the PSTN number of the telephone 124 to an IP address associated with the telephone 124 or an IP address of the cable modem circuit 124 servicing the telephone 124. In any of these operations, the VoIP terminal 146 must determine an IP address associated with the telephone 124.

Operation continues with the VoIP terminal 146 requesting the head end system 108 to setup and service a call to the telephone 124. With one construct of the present invention, the cable modem circuit 122 servicing telephone 124 has a unique IP address corresponding to the telephone 124 and the call setup request from the VoIP terminal 146 simply includes this IP address. With another construct of the present invention, the cable modem circuit 122 does not have a unique IP address corresponding to the telephone 124 but the head end system 108 maps the PSTN number of the telephone 124 to a cable network address corresponding to the telephone 124 or to the cable modem circuit 122. Using this cable network address, the head end system 108 is able to access the cable modem circuit 122 to initiate call setup to the telephone 124. Each of the telephone 124 and 126 and one or more other devices serviced by the cable modem circuit 122 and residing within the premises 112 may have differing cable modem network addresses and/or differing IP addresses. Thus, in response to a call setup request received from the VoIP terminal 146, the head end system 108 maps a received PSTN number to a unique IP address or cable network address corresponding to telephone 124. Of course, telephones 124 and 126 may share an IP address or cable network address.

The head end system 108 then interacts with cable modem circuit 122 and a corresponding interface circuit via cable network 102 to cause the interface circuit to alert telephone 124 that a call is incoming from VoIP terminal 146. Should telephone 124 be picked up to initiate service of the incoming call, the head end system 108 interacts with the cable modem circuit 122 and the interface circuit of premises 112 to establish a communication link between VoIP terminal 146 and telephone 124. In establishing this communication link, the interface circuit of the premises 112 may be required to convert the format of the call between a VoIP format and a PSTN format, e.g., POTS format. If the POTS telephone 124 does not pickup when the head end system 108 notifies it via the cable modem circuit 122 and interface circuit, the head end system 108 may deliver the incoming call to voice mail via server 140, for example.

According to another operation of the present invention, the head end system 108 tracks subscribers to the cable infrastructure system. Each subscriber may correspond to multiple terminals, e.g., one or more POTS phones, one or more PSTN phones, one or more cellular telephones, one or more VoIP terminals, etc. The head end system 108, in performing its subscriber tracking operations, may determine that a particular subscriber that is associated with telephone 124 is actively using VoIP terminal 148, for example. In such case, when an incoming call is not successfully delivered from VoIP terminal 146 to telephone 124, the head end system 108 attempts to establish a call between VoIP terminal 146 and VoIP terminal 148 via access point 142, the Internet 104, and access point 144. In another operation according to the present invention, the head end system 108 redirects an incoming call intended for POTS telephone 124 (based upon a PSTN number of POTS telephone 124) directly to VoIP terminal 148 instead of attempting delivery to POTS telephone 124. Redirection of the incoming call to VoIP terminal 148 may be accomplished by notifying the VoIP terminal 146 of the IP address of VoIP terminal 148. In another operation, the head end system 108 redirects incoming VoIP data packets intended for telephone 124 to VoIP terminal 148 using remarking or encapsulation techniques.

According to another operation of the infrastructure of FIG. 1, the cable infrastructure supports an outgoing POTS telephone call to a VoIP terminal. For example, a user of POTS telephone 132 initiates a call to VoIP terminal 148. In such operation, POTS telephone 132 via cable modem circuit 128 and interface circuit associated therewith interacts with the head end system 108 to initiate a call to VoIP terminal 148. The head end system 108, based upon the interaction with POTS telephone 132, based upon information it stores, and/or based upon information that the interface circuit/cable modem circuit 128 stores, sets up, and services a call from POTS telephone 132 to VoIP terminal 148. With this operation, the head end system 108 may perform address mapping between a subscriber identifier, a PSTN number, and another identifier to obtain the IP address of the VoIP terminal 148. In another operation, the head end system 108 receives the IP Address of the VoIP terminal 148 from a user of the telephone 130 via keypad input of the telephone 130. In still another operation, the interface circuit associated with the cable modem circuit 128 receives a dialed PSTN number via telephone 130 and maps the PSTN number to the IP address of the VoIP terminal 148. In yet another operation, the interface circuit receives the PSTN number from the VoIP terminal 148, digitizes the PSTN number, and forwards the digitized PSTN number to the head end system 108 for address mapping to the IP address of the VoIP terminal 148.

According to another operation of the infrastructure of FIG. 1, the head end system 108 tracks subscribers. Within the infrastructure, and as will be described further with reference to FIG. 7, each subscriber has a unique identifier, e.g., handle, name, PSTN number, etc. The head end system 108, for each tracked subscriber, tracks current location information. Current location information may include one or more active PSTN numbers and/or one or more active IP addresses.

Each PSTN number could correspond to a PSTN terminal, a voice mail system, a bridging device, or another device that may be accessed using the PSTN number. Further, each IP address may correspond to a VoIP terminal, a voice mail system, a bridging device or another device that may be accessed using the IP address. The subscriber tracking information may also indicate whether the subscriber is currently accepting incoming communications, priority of delivery of incoming communications to multiple devices, whether termination should be attempted simultaneously to multiple devices, time of day/day of month/day of week/month of year information relating to how to handle call delivery, and additional delivery specific information. Subscriber tracking may support termination of incoming calls to PSTN terminals, VoIP terminals, and/or to servers, for example.

The subscriber tracking functionality of head end system 108 may determine one or more currently active terminals for the subscriber, e.g., cell phone 138, PSTN phone 134, VoIP terminal 148, and VoIP terminal 146. With the subscriber tracking information of the head end system 108, calls received and intended for a serviced subscriber may be delivered to a currently active terminal for the subscriber. With these operations, the address mapping functionality of the head end system 108 maps a subscriber identifier to a particular PSTN number or IP address of one or more active terminals corresponding to the subscriber.

For example, the head end system 108 receives a request to complete a phone call to a subscriber of the infrastructure from POTS telephone 132. The head end system 108 receives a subscriber identity from the POTS telephone 132 via keypad interface information, a voice recognition system, or by other means that enable a user of POTS telephone 132 to identify the subscriber. The subscriber identity could be the PSTN number associated with the subscriber, a subscriber handle, or another identifier corresponding to the subscriber. The head end system 108 then maps the subscriber identity to the IP address and VoIP terminal 148 and initiates a call to VoIP terminal 148 for servicing. Should VoIP terminal 148 accept the call, the head end system 108 services the call to termination.

According to another operation of the present invention, the head end system 108 supports Internet 104 to PSTN 106 call bridging. With these operations, a subscriber using VoIP terminal 146, for example, desires to terminate a call to PSTN terminal 134. With these operations, the subscriber using VoIP terminal 146 accesses the head end system 108 via the access point 142 and the Internet 104. The head end system 108, learning that VoIP terminal 146 desires to reach PSTN terminal 134, first determines whether the subscriber has rights to the call bridging services of the head end system 108. When the subscriber has such rights, the head end system 108 initiates call setup to PSTN terminal 134 via PSTN 106. Such call setup and servicing requires that the head end system 108 bridge the call between the Internet 104 and the PSTN 106. In such case, the head end system 108 services both PSTN signaling with the PSTN 106 and VoIP signaling with the Internet 104. Further, the head end system 108 converts telephony formats between a PSTN telephony format and a VoIP telephony format. Call bridging according to these operations may be performed in conjunction with the address mapping and subscriber tracking functions previously described when locating a currently valid terminal for a subscriber to the system.

According to another operation of the infrastructure of FIG. 1, the head end system 108 tracks PSTN usage by its subscribers. Such PSTN usage charges are local call service charges and/or PSTN toll charges. For example, when a subscriber using VoIP terminal 146 accesses PSTN terminal 134 via the head end system 108, the head end system 108 tracks PSTN local access charges and toll charges for this usage and coordinates billing of the charges to the subscriber. PSTN usage charges are also tracked when servicing an outgoing PSTN 106 call from a POTS terminal 118 or 120, for example. The billing functions of the head end system 108 may be used to bill subscribers to the system on a monthly basis. Further, the head end system 108 may separately bill for bridging services incurred when being used simply to bridge calls between the PSTN 106 and the Internet 104.

According to another aspect of the present invention, the cable infrastructure supports a subscriber and an Internet telephone 150 that communicatively couples to the Internet network 104. The Internet telephone 150 is associated with the subscriber and a telephone number. At any time that it is operational, the Internet telephone 150 has a current Internet address. The current Internet address changes from time to time. For example, at position (A), the Internet telephone 150 is attached to AP 144 and has an IP address assigned by AP 144. However, at position (B), the Internet telephone 150 is attached to AP 142 and has an IP address that is assigned to the Internet telephone 150 by AP 142. At most/all times that the Internet telephone 150 is operational, the head end system 108 stores the current Internet address of the Internet telephone 150 in association with the telephone number. Upon obtaining or releasing an IP address, the Internet telephone 150 reports such gain/loss of a corresponding IP address to the head end system 108. In its operations, the head end system 108 retrieves the current Internet address upon receiving a call setup request that identifies the telephone number.

For example, in one operation, a user of PSTN telephone 152 dials the telephone number corresponding to the Internet telephone 150. The PSTN 106 routes a call setup request to the head end system 108 and, in response to the call setup request, the head end system 108 uses the current Internet address to establish a call pathway to the Internet telephone 150 (via the head end system 108). When Internet telephone 150 picks up the call, the head end system 108 bridges the call between the PSTN 106 and the Internet network 104 to service the call between the PSTN telephone 152 and the Internet telephone 150.

With another operation, a calling system, e.g., VoIP terminal 154 originates a call setup request. In doing so, the VoIP terminal 154 sends the call setup request across the AP 144 and Internet network 104 with an IP address that corresponds to the Internet telephone 150. The Internet network 104 routes the call setup request to the head end system 108 and, in response, the head end system 108 delivers the current Internet address to the VoIP terminal 154 (calling system). The VoIP terminal 154 then establishes a call directly to the Internet telephone 150 using the current Internet address of the Internet telephone 150.

The head end system 108 also supports calls originating from the Internet telephone 150 by both setting up a call session via the PSTN 106 and bridging the call session between the PSTN and the Internet network 106. Further, the head end system supports push-to-talk functionality for the Internet telephone 150. In such case, for example, if the Internet telephone 150 desires to contact POTS telephone 132, a user of the Internet telephone 150 depresses a single number. In response thereto, the Internet telephone 150 sends a request to the head end system 108, the head end system 108 processes the request by resolving the request to the destination terminal 132, and completes the call to the POTS telephone 132. The head end system 108 also supports push to talk functionality for calls originated by the Internet telephone 150 and intended for PSTN terminals, e.g., PSTN telephone 134, and for other Internet telephones, e.g., VoIP terminal 146. Such push talk support is supported between two Internet phones, between two POTS phones, and/or between an Internet and a POTS phone.

According to another embodiment of the present invention, the cable infrastructure resides within a communication infrastructure that includes the PSTN 106 and the Internet network 104 and supports a subscriber. With this embodiment, the communication infrastructure includes a POTS telephone 130 associated with the subscriber and a first telephone number. Further, an Internet telephone 150 is associated with the subscriber and a second telephone number. The Internet telephone 150 attaches to the Internet network 104 at a location that is remote from the POTS telephone 130. With this embodiment, the Internet telephone 150 has a current Internet address that changes from time to time and the head end system 108 stores the current Internet address in association with the second telephone number.

In its operations, the head end system 108 retrieves the current Internet address upon receiving a call setup request, the call setup request identifying the second telephone number. With one operation of this embodiment, the head end system 108 receives a call setup request via the PSTN 106 and responds to the call setup request by performing call bridging between the PSTN 106 and the Internet network 104. In other operations, the call setup request is received from a POTS terminal 126, from a PSTN telephone 152, or a cellular terminal 138. The head end system 108 may setup and service the call or, alternately, return the current Internet address to a requesting terminal. In servicing the call, the head end system 108 may bridge the call between the PSTN 106 and the Internet 104, between the Internet 104 and the cable network 102, and/or between the PSTN 106 and the cable network 102.

Figure 2:
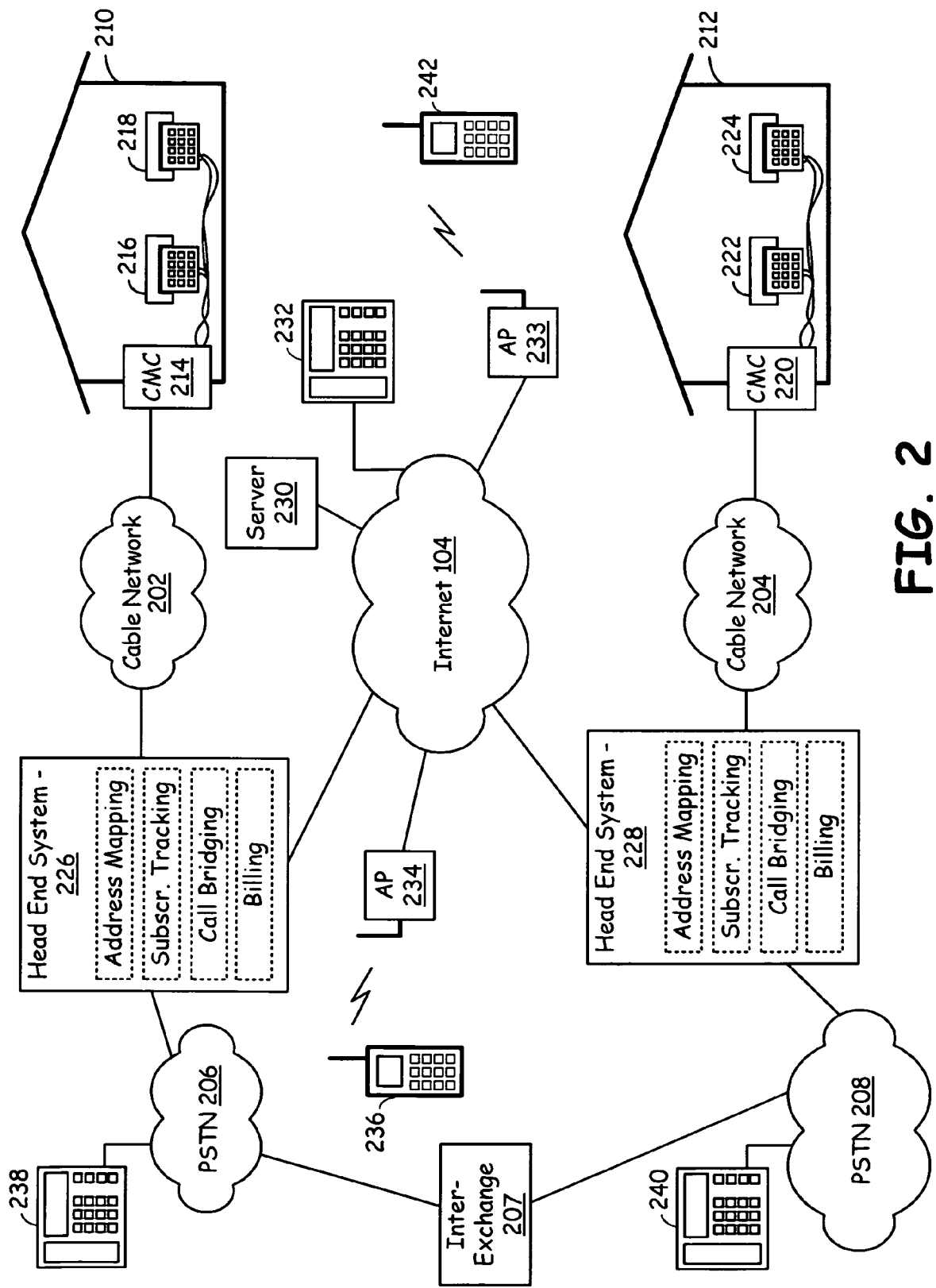
FIG. 2 is a system diagram illustrating a cable infrastructure constructed according to another embodiment of the present invention.

FIG. 2 is a system diagram illustrating a cable infrastructure constructed according to another embodiment of the present invention. The cable infrastructure forms a portion of a communication system that includes the PSTN 206 and 208 and the Internet 104. The cable infrastructure of FIG. 2 includes first head end system 226 and second head end system 228. First head end system 226 services a first plurality of subscribers and a first plurality of premises while second head end system 228 services a second plurality of subscribers and a second plurality of premises. First head end system 226 communicatively couples to cable network 202, PSTN 206, and the Internet 104. Cable modem circuit 214 and interface circuit (not shown) service POTS telephones 216 and 218 and communicatively couple to cable network 202. Premises 210 and the equipment located therein associate with a corresponding one of the first plurality of subscribers. Telephones 216 and 218 associate with the subscriber of premises 210. First head end system 226 services premises 210 via cable network 202 by communicatively coupling to cable modem circuit 214.

Second head end system 228 communicatively couples to the Internet 104, the PSTN 208, and to cable network 204. Second head end system 228 services premises 212 via cable network 204 by communicatively coupling to cable modem circuit 220. Cable modem circuit 220 and interface circuit (not shown) service POTS telephones 222 and 224. Premises 212 and the equipment located therein associate with a corresponding one of a second plurality of subscribers. Likewise, telephones 222 and 224 are associated with a subscriber of premises 212. The cable infrastructure of FIG. 2 is only a partial representation of an actual system. In an actual system, a large number of premises and subscribers would be serviced by each of cable network 202 and the head end system 226 and cable network 204 and the head end system 228.

With the embodiment of FIG. 2, the head end systems 226 and 228 each support address mapping operations and calls made from and terminated to telephones 216 and 218 and telephones 222 and 224. In setting up and servicing calls, address mapping is used to reduce or minimize PSTN charges. For example, a call between telephone 218 and telephone 224 is setup and serviced via an Internet pathway that couples the first head end system 226 and the second head end system 228. This Internet pathway includes the Internet 104 and is independent of the PSTN 206 and/or 208. In an operation according to this embodiment, a subscriber using telephone 218 initiates a call to telephone 224. To initiate this call, the subscriber via telephone 218 accesses the head end system 226 via the cable modem network 202 and cable modem circuit 214 with either a subscriber identifier corresponding to telephone 224 or the PSTN number of telephone 224. Address mapping operations of head end system 226 receive the destination PSTN number of telephone 224 or the corresponding subscriber identifier and determine that head end system 228 services telephone 224. Further, the address mapping operations may determine an IP address or cable network 224 address of the cable modem circuit 220/interface circuit that services the telephone 224. According to an alternate operation of the present invention, server 230 services the address mapping functionality separately or in cooperation with the head end systems 226 and 228.

Based upon the mapping information, head end system 226 accesses head end system 228 via the Internet 104 and requests head end system 228 to terminate a call to telephone 224. The head end systems 226 and 228 next cooperate to setup and service the call between telephones 218 and 224 via an Internet pathway that couples the first head end system 226 and the second head end system 228. The complete call routing pathway is independent of the PSTN 206 and 208.

According to another operation of the embodiment of FIG. 2, a user of PSTN telephone 238 desires to establish a call to telephone 224. Using conventional techniques, this call would require a long distance call via PSTN 206, Inter exchange link 207, PSTN 208. This long distance call would typically require state-to-state PSTN toll charges, country-to-country PSTN toll charges, or overseas PSTN toll charges, which would likely be substantial. With the operation of the present invention, to avoid these long distance PSTN toll charges, PSTN telephone 238 first communicates with head end system 226 via PSTN 206 requesting that a call be established to telephone 224. This communication may access the address mapping and/or subscriber tracking functionality of the head end system 226. In response thereto, the head end system 226 determines that telephone 224 may be reached via head end system 226, the Internet 104, head end system 228, cable network 204, cable modem circuit 220, and servicing interface circuit. The head end system 226 resolves the PSTN telephone number of (or subscriber identifier associated with) telephone 224 and establishes a communication path across the Internet 104 to head end system 228. Head end systems 226 and 228 interact to establish a call to telephone 224. Thus, even though the telephone 224 is serviced by head end system 228, PSTN toll charges are reduced/eliminated by routing the call via the head end system 226, the Internet 104, and the head end system 228.

According to another operation of the present invention of the embodiment of FIG. 2, telephone 216 initiates a call to PSTN terminal 240. Using conventional operations, significant PSTN toll charges would be incurred via a normal PSTN path from PSTN 206 to PSTN 208 using inter exchange link 207. According to the present invention, an outgoing PSTN phone call from telephone 216, based upon address mapping performed by the head end system 226, determines that reduced toll charges will be incurred by using a routing path from head end system 226 via Internet 104 to head end system 228 and via the PSTN 208 to PSTN terminal 240. Thus, the head end systems 226 and 228 work together to service this outgoing call from telephone 216 via a reduced cost communication path. The billing operations of head end systems 226 and 228 then track subscriber usage for PSTN billing purposes.

According to another aspect of the present invention, a subscriber using PSTN telephone 238 desires to establish a call to PSTN telephone 240. To reduce or eliminate the significant toll charges required to route a call between PSTN 206 and PSTN 208 via inter exchange link 207, operation according to the present invention supports bridging of the call to reduce PSTN toll charges. In such case, a user or subscriber using PSTN terminal 238 accesses head end system 226 via PSTN 208. Via a voice mail vectoring system, keypad interface, or other interaction with the user, the head end system 226 determines that the subscriber using PSTN telephone 238 desires to reach PSTN telephone 240 (having a corresponding PSTN number). With this interaction, the head end system 226 collects the destination PSTN digits from the calling PSTN telephone 238 and then performs address mapping to determine a nearest head end system 228 that may most easily and cost effectively terminate the PSTN call to PSTN terminal 240. The head end system 226 and head end system 228 via interaction across the Internet 104 then setup and later bridge the call between the PSTN terminal 238 and PSTN terminal 240 across the Internet 104. In servicing the call, the first head end system 226 bridges the call between the PSTN 206 and the Internet 104 while the second head end system 228 bridges the call between the Internet 104 and the PSTN 208. Such call bridging requires signaling on both PSTN 206 and 208 and the Internet 104 and conversion of the call between a PSTN telephony format and VoIP telephony format. In servicing the call between PSTN terminal 238 and PSTN terminal 240, the billing functionality of the head end systems 226 and 228 tracks not only PSTN toll charges incurred but also a call bridging duration. The head end systems 226 and 228 may meter the packet usage of the subscriber initiating the call for subsequent billing.

According to still another aspect to the present invention, the head end systems 226 and 228 support three-way calling between telephone 216, telephone 222, and VoIP terminal 232, for example. The head end systems 226 and 228 support four-way calling, for example between telephone 218, VoIP terminals 236 and 242 via access points 234 and 235, and telephone 224. Such four-way calling requires call servicing by both head end systems 226 and 228, Further still, multiple-way calling could be supported by head end systems 226 and 228 between PSTN terminals 238 and 240, any or all of VoIP terminals 236, 232, and 242, and in any of the other telephones 216, 218, 222, and 224.

According to another operation of the embodiments of FIG. 1 and FIG. 2, when a head end system 226, for example, receives an incoming call intended for a POTS telephone 216, the head end system 226 may both send an alert signal to the telephone 216 and to a remote VoIP terminal 242 associated with subscriber. In such case, the head end system 226 has address mapping and subscriber tracking information to indicate that the subscriber was last monitored using VoIP terminal 242. However, because the usage of VoIP terminal 242 by the subscriber occurred some time ago, the head end system 226 determines that parallel call processing to telephone 216 and to VoIP terminal 242 is justified.

According to another operation of the embodiments of FIG. 1 and FIG. 2, a call from PSTN terminal 240 intended for POTS telephone 224 (associated with a subscriber) via head end system 228, cable network 204, and cable modem circuit 220 is incoming. In such case, the head end system 228 first alerts the POTS telephone 224 that is associated with a subscriber. Then, head end system 228 waits for pickup by the POTS telephone 224 that is associated with the subscriber. If the subscriber picks up the POTS telephone 224, the head end system 228 terminates the incoming call to the POTS telephone 224. However, when the POTS telephone 224 does not pickup, the head end system 228 forwards the incoming call from PSTN terminal 240 via PSTN 208 to a remote VoIP terminal 238 associated with the subscriber. Of course, different variations on these operations may occur based upon subscriber input. For example, the subscriber may direct head end system 228 to deliver all incoming communications to voice mail serviced by server 230, for example. Further, the subscriber may direct that his or her POTS telephone 222 be first alerted, the incoming call next be attempted to be terminated to a VoIP terminal 236, then to a PSTN terminal 238, and finally to voice mail. Such operations are all supported by head end systems 226 and 228.

Figure 3:
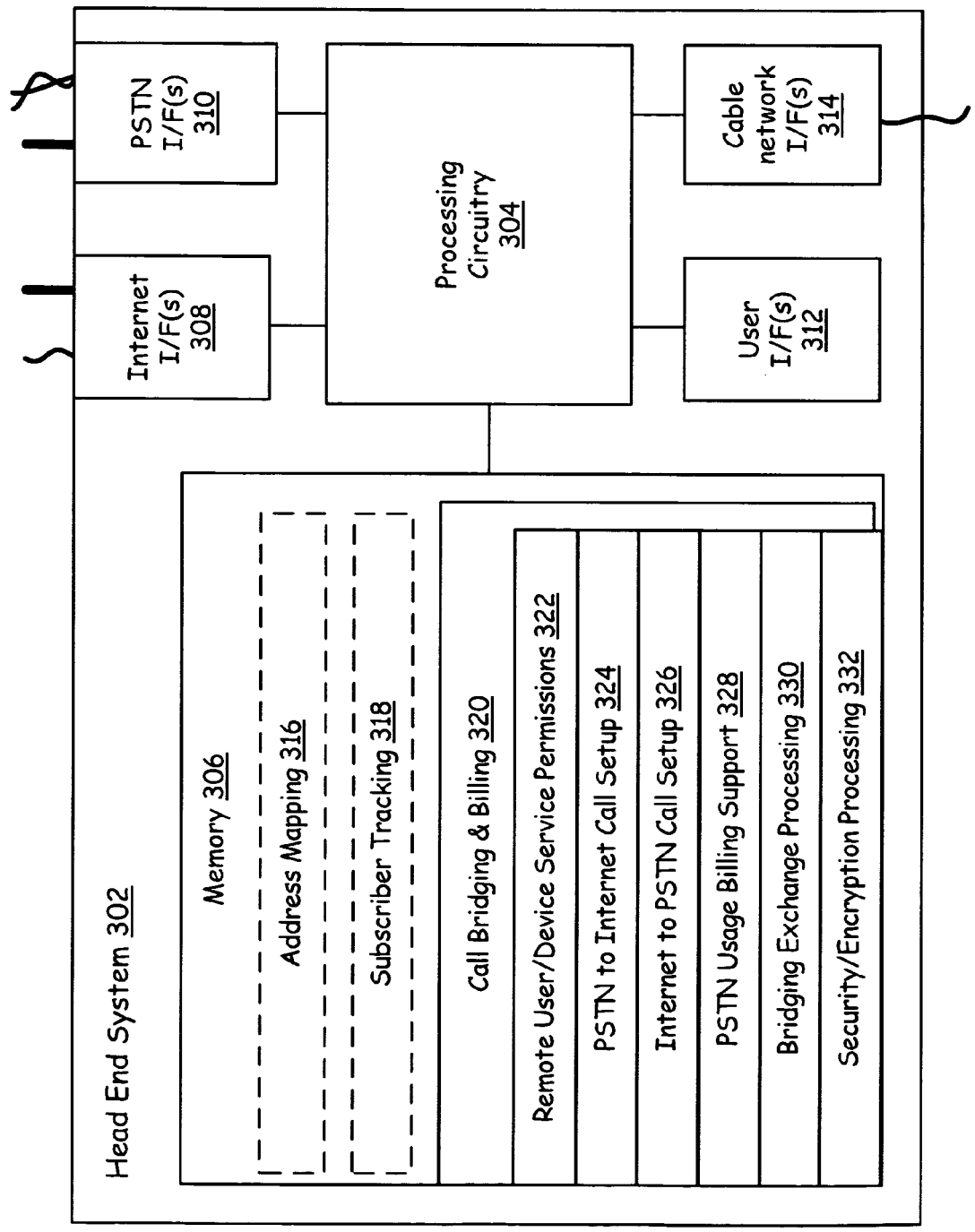
FIG. 3 is a block diagram illustrating a head end system constructed according to an embodiment of the present invention.

FIG. 3 is a block diagram illustrating a head end system constructed according to an embodiment of the present invention. The head end system 302 may be any of head end system 108, head end system 226, or head end system 228 of FIG. 1 or 2. The head end system 302 may include additional functionality relating to the operations previously described with reference to FIGS. 1 and 2 even though such functionality is not explicitly described with reference to FIG. 3. Head end system 302 includes processing circuitry 304, memory 306, Internet interface(s) 308, PSTN interface(s) 310, cable network interface(s) 314, and user interface(s) 312. Processing circuitry 304 is one or more of a standard instruction set microprocessor, a reduced instruction set microprocessor, a digital signal processor, an application specific integrated circuit, a field programmable gate array, and any other processing circuit operable to execute instructions and process data.

Memory 306 is one or more of read-only memory, random access memory, a hard disk drive, tape drive, flash RAM, flash ROM, and any other type of memory capable of storing instructions and data. Internet interface(s) 308 interfaces the head end system 302 to the Internet 104. According to the present invention, head end system 302 executes operations to support the communication functions previously described with reference to FIGS. 1 and 2. Stored in memory 306 are software instructions that, when executed by the processing circuitry 304, cause the head end system 302 to perform the operations of the present invention. Upon execution of these software instructions, the processing circuitry 304 creates data that is also stored in memory. Each set of software instructions stored in memory has not only software instruction components but also data components, even though these components are referred to jointly hereinafter.

The Internet interface(s) 308 supports a wired interface and/or a wireless interface to the Internet 104 such as a fiber optic connection, a high speed wireless interface, or another type of interface operable to support packet data support communications between head end system 302 and the Internet 104. PSTN interface 310 is a wired and/or wireless interface that inter couples the head end system 302 to the PSTN 106, e.g., T1 interface, T3 interface, twisted pair interface, and/or a wireless local loop interface. The cable network interface 314 includes one or more of an optical cable interface and/or a coaxial cable interface to a cable network 102, 202, or 204. User interface(s) 312 include keyboard interfaces, monitor interfaces, and/or other user input devices and user display devices.

Address mapping instructions and data 316 support address mapping functionality of the head end system 302 among subscriber identifiers, IP addresses, PSTN numbers, and cable network addresses of POTS telephones, PSTN telephones, and VoIP terminals according to the present invention. For example, each of these telephones 118, 120, 124, 126, 130, and 132 has associated therewith a PSTN telephone number. The address mapping instructions 316, upon execution by the processing circuitry 304, cause the head end system 302 to map PSTN numbers to cable network addresses and/or IP addresses of the infrastructure of the present invention. Further, the address mapping instructions 316, upon execution by the processing circuitry 304, causes the head end system to map subscriber identifiers to PSTN numbers, IP addresses, and/or cable network addresses of corresponding terminals. Finally, the address mapping instructions 316, upon their execution by the processing circuitry 304, causes the head end system 302 to map PSTN numbers, IP addresses, and/or cable network addresses to subscribers to the cable infrastructure of the present invention. Consistent with these mapping operations, an incoming PSTN call received via PSTN interface(s) 310 is mapped to a corresponding IP address or cable network address via the address mapping operations and data 316 based upon a destination PSTN number. Further, consistent with these mapping operations, outgoing calls received via the cable network interface(s) are mapped to a corresponding IP address, cable network address, or PSTN number via the address mapping operations and data 316 based upon a desired destination PSTN number, desired destination subscriber identity, or desired destination IP address or PSTN number, for example. Destination information received via this address mapping is then used for call termination to the corresponding serviced telephone, for example.

The subscriber tracking instructions 318, when executed by the processing circuitry 304, enable the head end system 302 to track subscribers to the cable infrastructure. For example, when a subscriber transitions to being associated with telephone 118, to VoIP terminal 148, to PSTN terminal 134, and then to cellular handset 138 of FIG. 1, the subscriber tracking operations of the head end system 302 keep track of a primary terminal associated with the particular subscriber. Then, incoming communications intended for the particular subscriber are mapped to a currently valid terminal for the subscriber and then delivered by head end system 302 accordingly.

Also stored in memory 306 are call bridging and billing instructions 320. The call bridging and billing software 320 upon execution by processing circuitry 302 enable the head end system 302 to bridge calls between the Internet interface 308 and the PSTN interface 310, between the PSTN interface 310 and the cable network interface 314, and between the Internet interface 308 and the cable network interface 314. The call bridging and billing instructions 320 also support, upon their execution, redirection of incoming packets received via the Internet interface 308 out via the Internet interface 308 to a differing destination IP address. Such operation may occur, or example with reference to FIG. 1, when an incoming VoIP call from VoIP terminal 146 is intended for telephone 118. However, based upon the subscriber tracking 318 operations and address mapping operations, it is determined that a currently valid terminal for the subscriber is VoIP terminal 148. In order to deliver the call to the current valid VoIP terminal 148, the processing circuit redirects incoming packets to the VoIP terminal 148. Likewise, packets sent from VoIP terminal 148 intended for subscriber are redirected to VoIP terminal 146.

Memory 306 also stores remote user/device service permission instructions 322. Upon execution of these instructions 322, the head end system 320 determines whether particular subscribers and their associated terminals have permission to receive calls and/or to place calls from a remote location. For example, a subscriber to the cable infrastructure may send a remote call setup request from a VoIP terminal, requesting bridging to the PSTN. Upon execution of the remote users and devices instructions 322, the head end system 302 determines whether this remote user has permission to use the bridging operations of the head end system 302.

PSTN to Internet call setup instructions 324, upon execution by processing circuitry 304, enable head end system 302 to setup and service a PSTN to Internet call. For example, a remote subscriber may desire to bridge a call from PSTN terminal 134 to VoIP terminal 146 of FIG. 1. Should the subscriber have the right to do so, the subscriber accesses head end system 108 (302) to initiate the PSTN to Internet call. Likewise, Internet to PSTN call setup instructions 326, upon execution by processing circuitry 304, enable the head end system 302 to setup and service an Internet to PSTN call. Such call may occur when VoIP terminal 148 desires to access cellular terminal 138 of FIG. 1. Because the user of VoIP terminal 148 is a subscriber to the system, it can access the head end system 302 (108) to request setup of the Internet to PSTN call.

Also supported by the head end system 302 are PSTN usage billing support instructions 328, bridging exchange processing instructions 330, and security/encryption processing instructions 332. Each subscriber to the system may use the head end system 302 to access the PSTN. The PSTN usage billing support instructions 328, upon execution by processing circuitry 304, cause the head end system 302 to monitor PSTN usage by subscribers and to bill for such PSTN usage. Bridging exchange processing instructions 330, upon their execution by the processing circuitry 304, cause the head end system 302 to interact with another head end system to enable exchange of services. As was previously described with reference to FIG. 2, multiple head end systems 226 and 228 cooperatively bridge calls across the Internet 104 between different PSTN segments 206 and 208. The bridging usage of the head end systems 226 and 228 may be exchanged on a like kind basis. This like kind basis is tracked among a group of head end systems to ensure that no head end system is performing or bridging for other head end system in a manner that is not fair according to prior agreement.

Security/encryption processing instructions 332, upon execution by processing circuitry 304, enable the head end system 302 to secure and/or encrypt communications serviced by the head end system 302. Such security encryption may include a private key public key methodology for encrypting communications between telephones and remote terminals. Such encryption/security processing prevents snooping of communications by unintended terminals.

Figure 4:
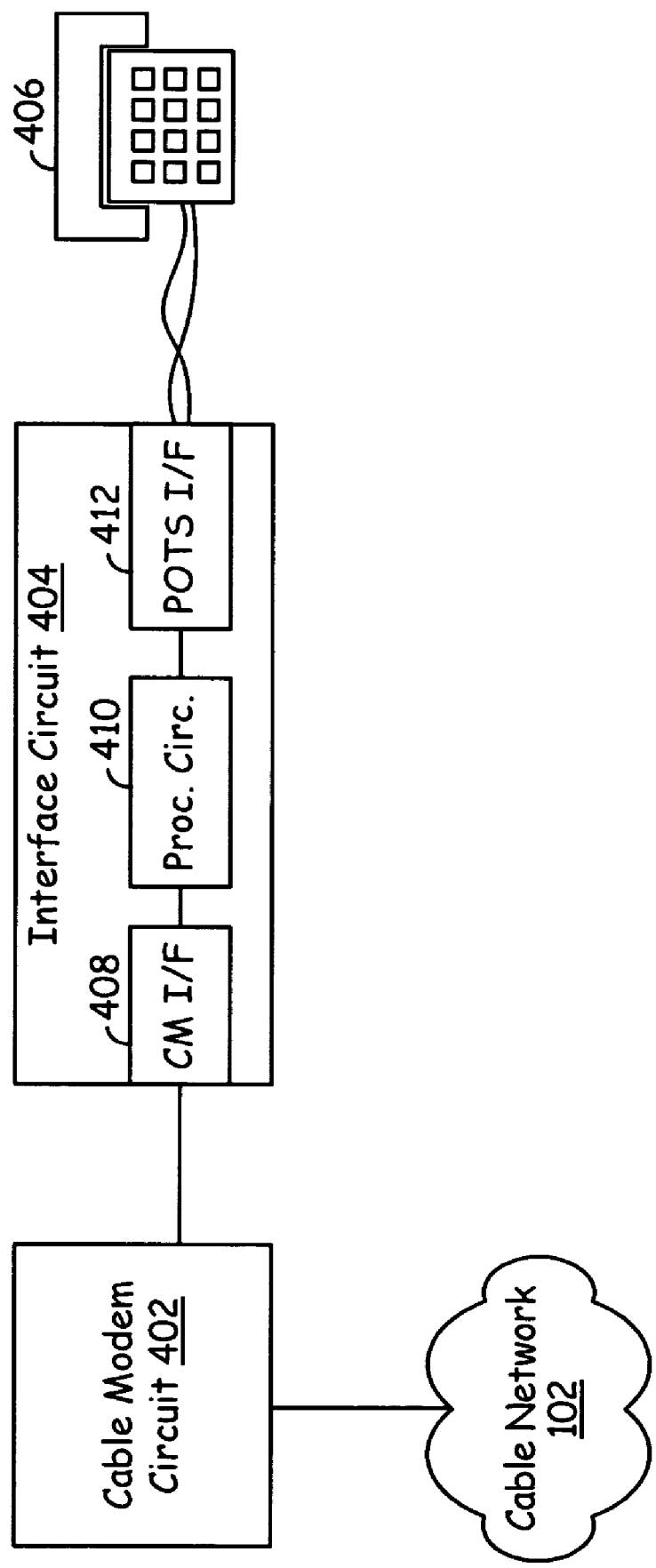
FIG. 4 is a block diagram illustrating a cable modem circuit and an interface circuit constructed according to an embodiment of the present invention.

FIG. 4 is a block diagram illustrating a cable modem circuit and an interface circuit constructed according to an embodiment of the present invention. The cable modem circuit 402, the interface circuit 404, and a POTS telephone 406 are shown. The cable modem circuit 402 couples to cable network 102, which couples to a head end system 108. The cable modem circuit 402 also couples to interface circuit 404 via cable modem interface 408. Interface circuit 404 also includes processing circuit and POTS interface circuit 412. The POTS interface circuit 412 couples to POTS telephone 406 via a twisted pair of conductors. The POTS interface circuit 412 implements a POTS interface protocol to POTS telephone 406.

The cable modem interface 408 of the interface circuit 404 interfaces to the cable modem circuit 402. This connection may be according to a wireless LAN or a wired LAN standard. Processing circuit 410 bridges communications between a POTS telephony format (PSTN telephony format) and a format consistent with cable modem circuit 402. The cable modem circuit 402 may interface with the interface circuit 404 via the cable modem interface 408 using a LAN (Ethernet) communication standard. In such case, the processing circuit 410 would convert between the POTS format and an Ethernet format. With this format, the processing circuit 410 may implement a VoIP communication format. The cable modem circuit 402 via the cable network 102 to a head end system 108 may support the DOCSIS communication specification, for example.

Figure 5:
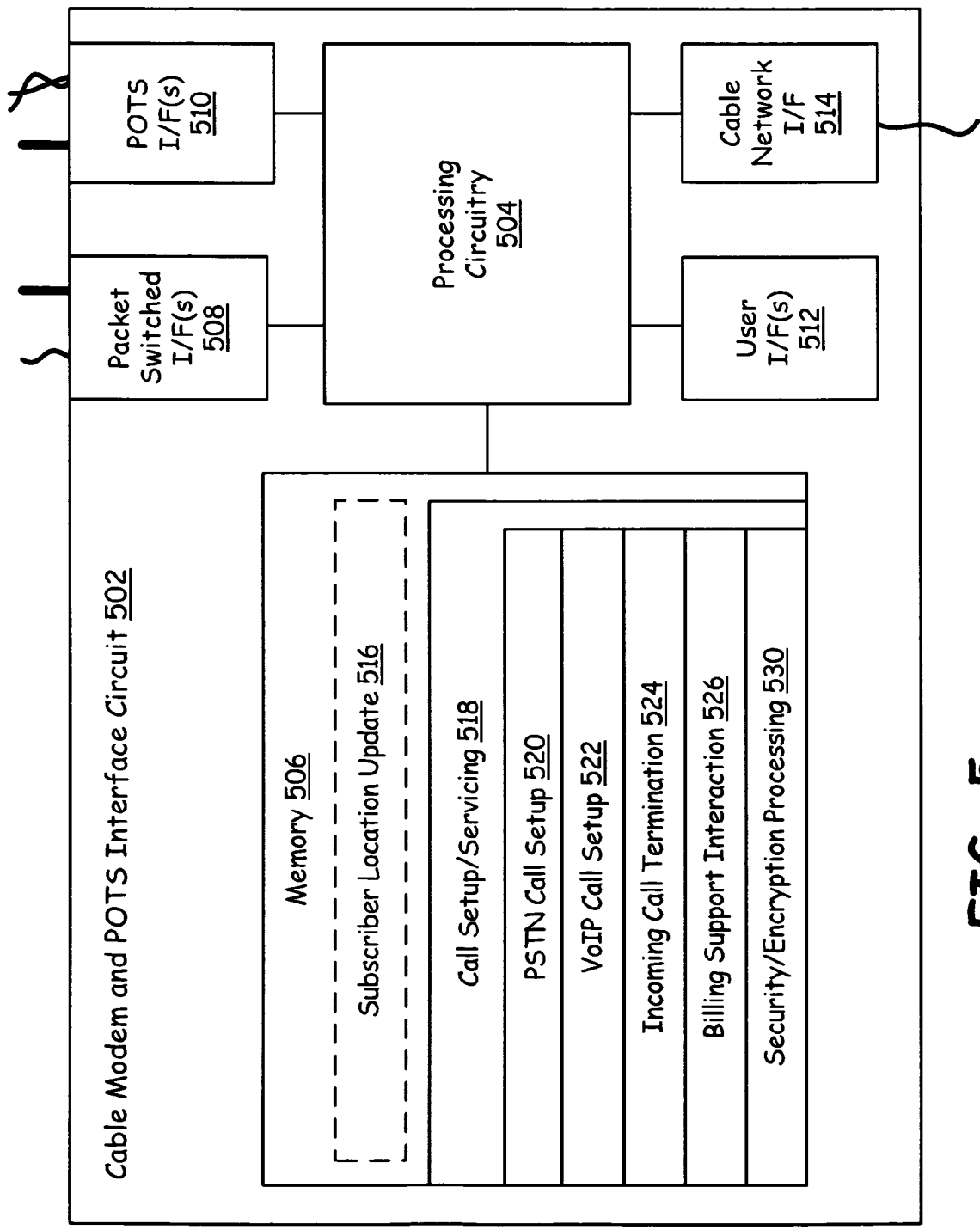
FIG. 5 is a block diagram illustrating a cable modem and POTS interface circuit constructed according to an embodiment of the present invention.

FIG. 5 is a block diagram illustrating a cable modem and POTS interface circuit constructed according to an embodiment of the present invention. As contrasted to the structure of FIG. 4, the structure of FIG. 5 includes both cable modem and POTS interface circuits. The cable modem of POTS interface circuit 502 includes memory 506, processing circuitry 504, packet switched interface(s) 508, POTS interface(s) 510, a cable network interface(s) 514, and a user interface(s) 512. The processing circuitry 504 may include a digital signal processor, a standard instruction set microprocessor, a reduced instruction set microprocessor, an application specific integrated circuit, a field programmable gate array, or another integrated circuit capable of executing software instructions and operating upon data. The memory 506 is one or more RAM, ROM, flash RAM, flash ROM, hard disk, optical media, or other storage capable of storing instructions and data.

The POTS interface 510 communicatively couples to one or more telephones via a wired or wireless link. For example, POTS interface 510 may communicatively couple to one or more telephones via twisted pair wiring or via a cordless phone interface. The packet switched interface 508 supports wired and/or wireless packet switched communications. For example, the packet switched interface 508 may support a wireless LAN communication interface standard such as 802.11a, b, g and/or n, a wireless personal area network (WPAN) operating standard such as Bluetooth, or a wired LAN interface, e.g., Ethernet. The cable network interface 514 communicatively couples the cable modem and POTS interface circuit 502 to the cable network 102. The cable network interface 514 supports communications according to the DOCSIS specification, for example. User interface(s) 512 support keyboard, mouse, monitor, speakers, and other user interface devices.

According to the present invention, the cable modem and POTS interface circuit 502 includes memory 506 that stores software instructions and data to support operations according to the present invention. These software instructions include subscriber location update instructions 516 that, upon execution by the processing circuitry 504, cause the cable modem and POTS interface circuit 502 to interface with a head end system 108 to provide subscriber location update information. For example, a user via the user interface 512 may manually enter instructions that all incoming telephone calls are to be forwarded to a VoIP terminal 148, for example. In response, the cable modem and POTS interface circuit 502 interacts with a head end system 108 to update subscriber tracking and/or address mapping information stored at the head end system 108. This information may be later used by head end system 108 to service incoming calls intended for a telephone supported by the cable modem and POTS interface circuit 502. As another example of an operation of the cable modem and POTS interface circuit 502, a user may establish rules based upon time, day of week, day of month, or month of the year for subscriber location update and tracking.

The memory 506 also stores call setup and servicing instructions 518 that, upon execution by the processing circuitry 504, cause the cable modem and POTS interface circuitry 502 to setup and service calls for telephones coupled via the POTS interface 510. These instructions include PSTN call setup instructions 520, which, upon their execution by the processing circuitry 504, causes the cable modem and POTS interface circuit 502 to communicate with head end system 108 to initiate a PSTN call to PSTN terminal 134, for example. Likewise, upon execution of VoIP call setup instructions 522 by the processing circuitry 504, the POTS interface 510 and the cable network interface 514 initiate a call to VoIP terminal 148, for example. Incoming call termination instructions 524, upon executed by processing circuitry 504, cause the cable modem and POTS interface circuit 502 to terminate incoming calls received from the head end system 108 via the cable network 514 to a telephone coupled via the POTS interface 510. Further, a local VoIP telephone can be serviced by the packet switched interface 508. In such case, upon execution of incoming call termination instructions 524 by the processing circuitry 504, the cable modem and POTS interface circuitry 502 attempts delivery of an incoming call via the packet switched interface(s) 508.

Also stored in memory 506 are billing support interaction instructions 526. Upon execution of the billing support interaction instructions 526 by the processing circuitry 504, the cable modem and POTS interface circuit 502 interfaces with a servicing head end system 108 to perform billing operations. Further, security/encryption processing instructions 530 upon execution by processing circuitry 504 cause the cable modem and POTS interface circuit 502 to enable secure and/or encrypted communications via the POTS interface 510 and/or the packet switched interface 508 and the cable network 514. Such operations precludes snooping by another terminal and/or the head end system or systems that service the communication.

Figure 6:
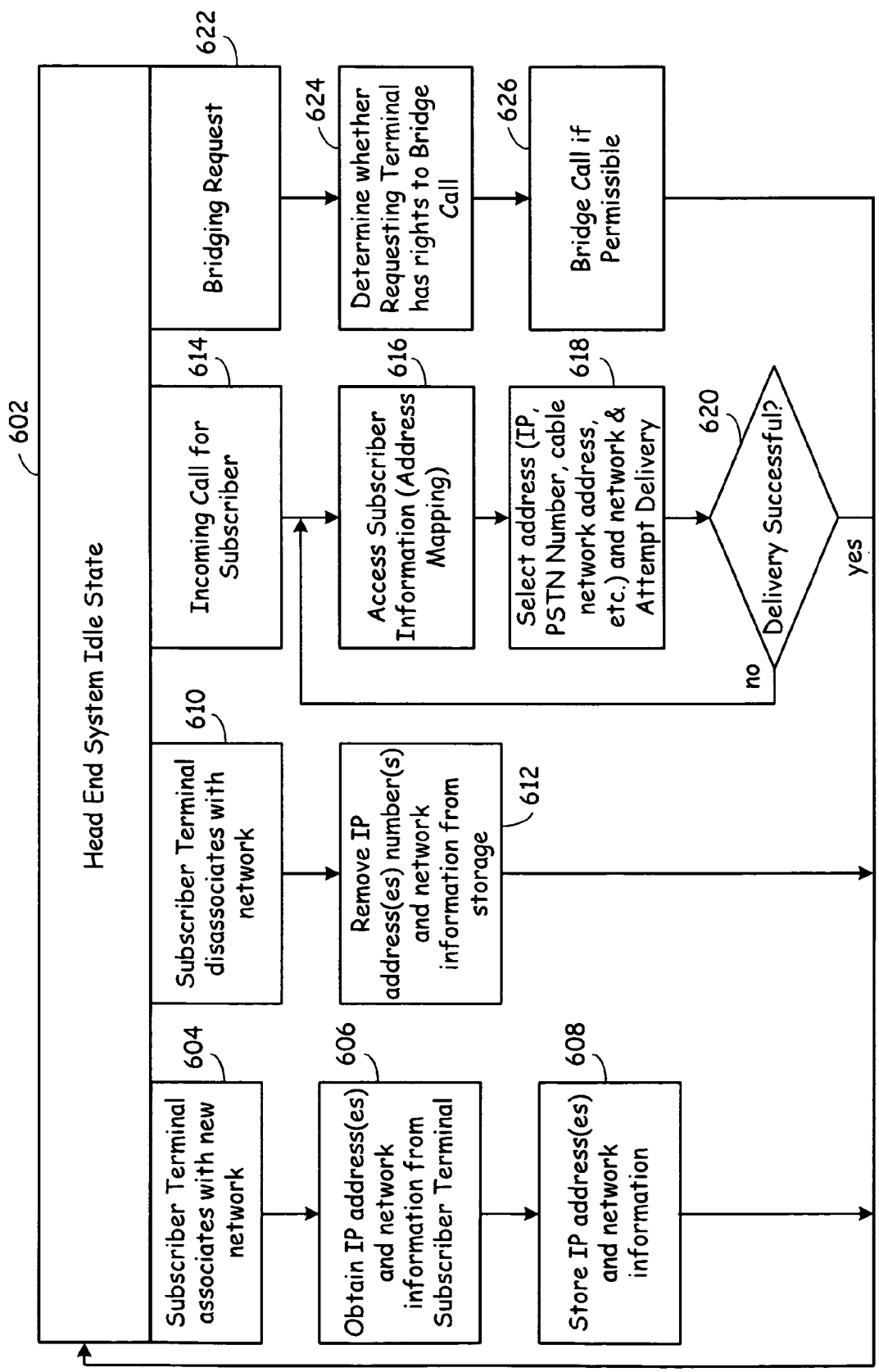
FIG. 6 is a flow chart illustrating operation of a head end system according to an embodiment of the present invention.

FIG. 6 is a flow chart illustrating operation of a head end system according to an embodiment of the present invention. Operation commences with the head end system in an idle state (Step 602). Various operations occur from the head end system idle state of step 602. The reader will appreciate the head end of the present invention perform many operations not described with reference to FIG. 6 and that the operations described with reference to FIG. 6 are performed according to the present invention.

A first operation according to the present invention occurs when a subscriber terminal that is tracked by the head end system associates with a new network (Step 604). Referring particular to FIG. 1, when VoIP terminal 146 is being tracked by the head end system and associates with access point 142, the operation at 604 commences. After operation 604 commences, the head end system obtains the IP address or addresses and network information from the subscriber terminal 146 (Step 606). Upon attachment of the VoIP terminal 146 to access point 142, the VoIP terminal 146 is provided with an IP address by access point 142. Thus, upon attachment, the VoIP terminal 146 reports its newly assigned IP address to the head end system at Step 606. The head end system then stores the IP address and network information received from VoIP terminal 146 (Step 608). From Step 608, operation returns to Step 602.

Likewise, when a VoIP terminal roams away from a previously servicing access point, e.g., 142, the subscriber terminal 146 disassociates with the network (Step 610). With this disassociation, the VoIP terminal 146 or a previously servicing access point 142 sends a message to a servicing head end system 108 that the VoIP terminal 146 has disassociated. In response, the head end system removes the IP address and network information from storage that was previously used for tracking (Step 612). Thus, with this update having occurred, the head end system 108 understands that it can no longer forward a communication or otherwise access the VoIP terminal 146 via the disassociated network. From Step 612, operation returns to Step 602.

From the idle state of Step 602, a head end system may receive an incoming call intended for a serviced subscriber (Step 614). The subscriber may be identified based upon an IP address, a subscriber handle, a PSTN number, or upon another identifier of the subscriber. In response to the incoming call, the head end system accesses the subscriber information (address mapping) for the subscriber (Step 616). In response to its access of the subscriber information, the head end system selects an address for delivery of the call. Such address may be an IP address, a PSTN number, a cable network address or another address associated currently with the subscriber. The head end system then attempts to deliver the call using that address (Step 618). In a first instance at Step 618, the head end system 108 may attempt delivery of the incoming call to telephone 126, for example. In the second instance, the head end system 108, based upon subscriber tracking address and mapping information, determines that the subscriber is currently associated with PSTN terminal 134 and attempts delivery at that location. As another example, based upon the address mapping and subscriber tracking information, the head end system determines that the subscriber is currently associated with VoIP terminal 148 and attempts delivery at VoIP terminal 148. If delivery is not successful (as determined at Step 620), the head end system attempts to access additional subscriber information for forwarding the call to a different location. If delivery is successful (as determined at Step 620), the call is serviced to completion and operation returns to the head end system idle state (Step 602). Upon a certain number of failures or an exhausted attempted delivery operation, the incoming call may be sent to voice mail or a busy signal may be provided to the caller.

In another operation according to the present invention, the head end system receives a request to bridge a call between the Internet and the PSTN. The bridging request may be from a subscriber to the system or from another head end system. As a first example, referring to FIG. 1, a subscriber using VoIP terminal 148 desires to access cell phone 138. The subscriber sends a bridging request via the VoIP terminal 148 to head end system 108 requesting bridging. The head end system 108 then determines whether the requesting VoIP terminal 148 (subscriber) has the right to bridge the call (Step 624). If bridging is permitted for the VoIP terminal 148 (subscriber), the head end system 108 sets up and bridges the call to cellular phone 138 (Step 626). If not, the call is terminated.

As another example of these bridging operations, head end system 226 receives a request from head end system 228 to bridge a call to PSTN terminal 238 via PSTN 206. Referring to FIG. 2 and FIG. 6, the requesting head end system 228 may have received a subscriber request from PSTN terminal 240 to terminate a call to PSTN terminal 238. However, to avoid significant toll charges, as may be experienced in an overseas call, the head end system 228 requests that the head end system 226 bridge calls to PSTN 206, which is local to PSTN terminal 238. With these bridging operation, significant PSTN toll charges are reduced because the call is primarily routing via the Internet 104.

Figure 7:
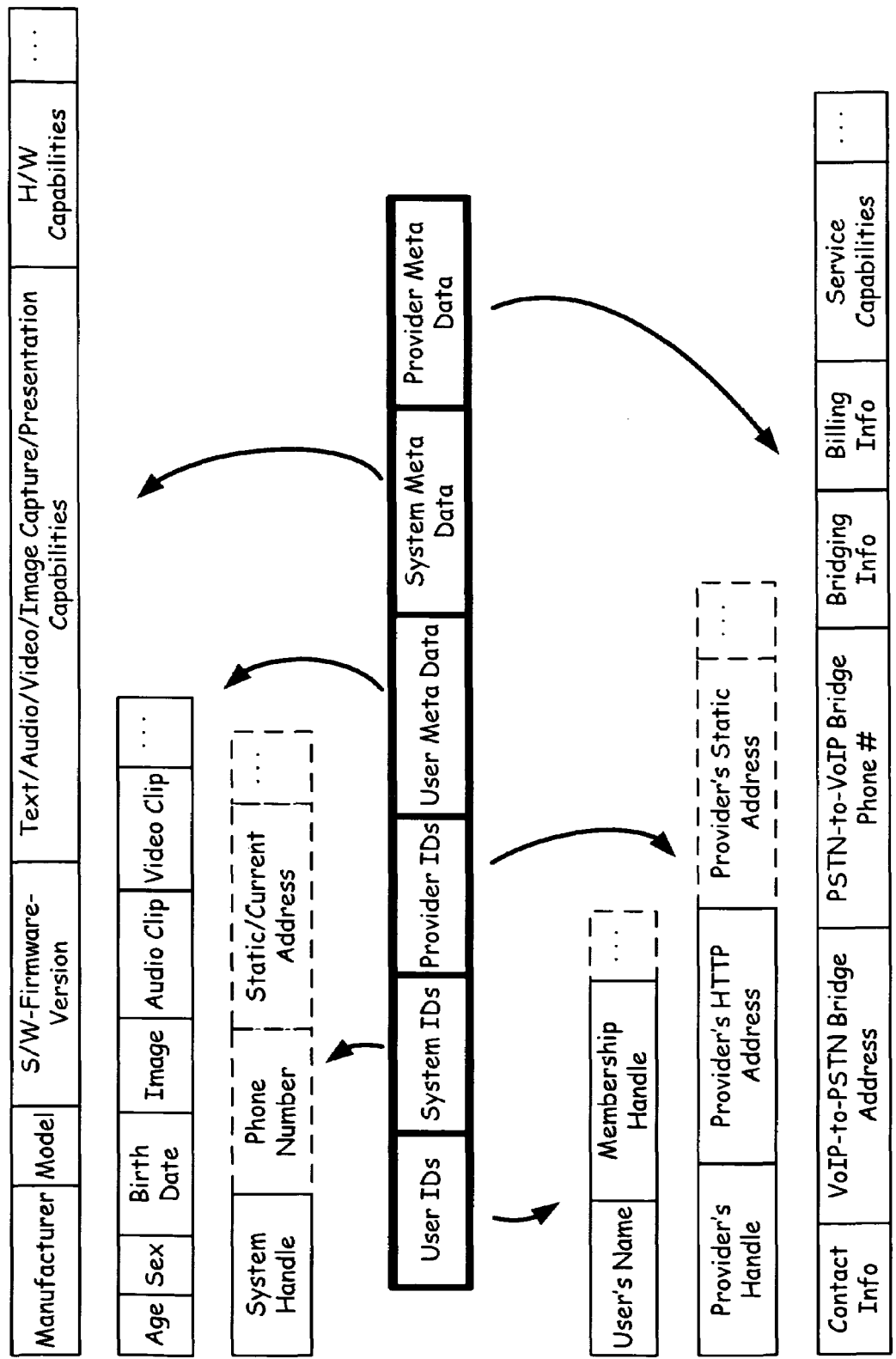
FIG. 7 is a block diagram illustrating subscriber tracking and identification information employed according to an embodiment of the present invention.

FIG. 7 is a block diagram illustrating subscriber tracking and identification information employed according to an embodiment of the present invention. FIG. 7 depicts various cross reference identifiers that may include one or more user identifiers, terminal identifiers and service provider identifiers. These user identifiers may be stored and managed by a head end system of the present invention. For example, user identifiers may include user name, member handle, or other like information. System identifiers may include a system handle, phone number, ESN, stacker card address, or other like information. A provider I.D. may include a provider handle, a network address, a static address, or other like information. In addition to the user system and provider identifiers, various meta data may be associated with these identifiers. For example, personal information such as the age, sex, birth date, image, audio clip, video clip, authorization information, or other like information may be associated with a user. The terminal identifier may contain information such as manufacturer, model number, software version, multi media capabilities, hardware capabilities, or other like information. The service provider Meta data may include contact information.

Subscriber identifiers may comprise a user's name or some "handle" that uniquely identifies a user with that service provider. A service provider identifier might comprise a web address, provider name, or the provider's static IP address. A terminal identifier might be a computer name, telephone number, or serial number, for example. User information might be nearly anything related or unrelated to the overlying service (age, sex, birthdate, etc.). Terminal information might include manufacturer, model number, firmware/software/hardware version, image/video/audio capabilities, processing power, memory/storage capability, battery capability and status, operational status, available CODECs and versions, etc. As with other metadata, the terminal information might be related or not to the overlying service. Service provider information might include zero or more of service descriptions, service characteristics/limitations, service status, billing info, etc. This meta data may be used in managing subscriber information according to the present invention.

Figure 8:
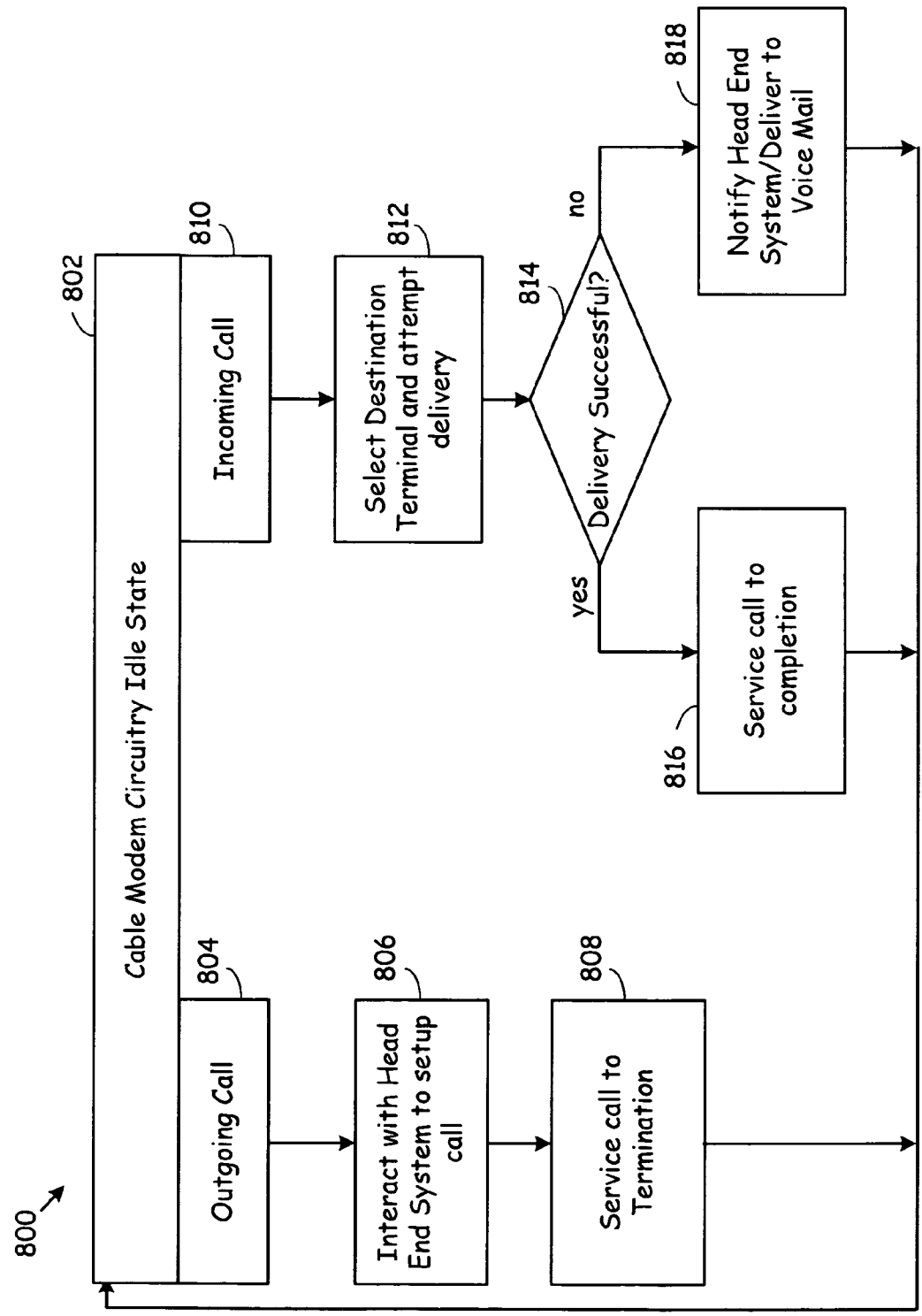
FIG. 8 is a flow chart illustrating cable modem circuit operations according to an embodiment of the present invention.

FIG. 8 is a flow chart illustrating cable modem circuit operations according to an embodiment of the present invention. The cable modem circuit resides in an idle state (Step 802) until operations according to the present invention are performed. A first operation according to the present invention is performed when the cable modem circuit receives an outgoing call request (Step 804). In such case, the cable modem circuit interacts with a servicing head end system to setup the call (Step 806). After successful interaction with the head end system, the cable modem circuit sets up and services the call to termination (Step 808). From Step 808, operation returns to Step 802.

In another operation according to the present invention, the cable modem circuit is requested to service an incoming call (Step 810). Based upon information received at the incoming call request, the cable modem circuit selects a destination terminal and attempt delivery (Step 812). As was previously described with reference to FIGS. 1, 2 and 5, the cable modem circuit may service a plurality of telephones and/or VoIP terminals. In such case, at Step 812, the cable modem circuit selects one of the terminals for call delivery. The selection may be based upon a PSTN number, IP address or subscriber handle associated with the incoming call. With the terminal selected, the cable modem circuit attempts delivery at Step 812. If delivery is successful (as determined at Step 814), the call is serviced to completion (Step 816). However, if delivery is not successful (Step 814) the cable modem circuit notifies the head end system that the termination call was unsuccessful. Alternatively, the cable modem circuit may deliver the call to local voice mail (both at Step 818). When the cable modem circuit notifies the head end that the delivery is unsuccessful, the head end may deny service of the call or deliver the call to a different destination terminal.

As one of average skill in the art will appreciate, the term "communicatively coupled," as may be used herein, includes wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled".

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A cable infrastructure to operate with a public switched telephony network, a cable network and an Internet network, comprising:
    a plurality of cable modem circuits that couple to the cable network, wherein each of the plurality of cable modem circuits is associated with a subscriber;
    a plurality of telephones, each having both a POTS (Plain Old Telephone System) interface and a unique telephone number, in which each of the plurality of telephones is associated with a corresponding subscriber;

a plurality of interface circuits, each coupling a corresponding cable modem circuit with a corresponding POTS interface of a corresponding telephone; and a head end system coupled to the cable network, the public switched telephony network, and the Internet network, in which the head end system supports address mapping of a plurality of terminal addresses for a particular subscriber that enables communication exchanges between the telephones and Internet telephony devices, wherein the head end system is further operable to receive a location update from the particular subscriber that includes a new network address of an active terminal for the particular subscriber, to store the new network address in the address mapping associated with the particular subscriber and to track the currently active terminal for the particular subscriber by last usage in the address mapping, in which the plurality of terminal addresses for the particular subscriber includes a current Internet (IP) address of a roaming voice over Internet (VoIP) terminal and in which the head end system tracks a location and corresponding IP address of the roaming VoIP terminal, wherein the head end system is operable to alert a particular POTS telephone associated with the particular subscriber of an incoming call through the cable network, wait for pickup by the particular POTS telephone associated with the particular subscriber, and when the particular POTS telephone picks up, to service the incoming call to terminate to the particular POTS telephone, but when the particular POTS telephone does not pickup, to forward the incoming call to a currently active terminal of the subscriber and when the currently active terminal is the roaming VoIP terminal, to forward the incoming call over the Internet network to the roaming VoIP terminal at the current IP address noted in the address mapping associated with the particular subscriber.

2. The cable infrastructure of claim 1, wherein each of the plurality of cable modem circuits includes a cable network interface, at least one POTS interface and a bridging circuit operable to bridge a call between a VoIP format and a POTS format.

3. The cable infrastructure of claim 1, wherein each of the plurality of cable modem circuits has associated therewith at least one public switched telephony network number and at least one IP address.

4. The cable infrastructure of claim 1, wherein the head end system is further operable to forward an incoming public switched telephony network call to the roaming VoIP terminal via the Internet to the particular subscriber.

5. The cable infrastructure of claim 1, wherein the head end system is further operable to send an alert to the roaming VoIP terminal associated with the particular subscriber when the incoming call to the POTS telephone is received by the head end system.

6. A cable infrastructure to operate with a public switched telephony network, at least one cable network and an Internet network, comprising:

a first plurality of cable modem circuits that couple to a first cable network, wherein each of the first plurality of cable modem circuits is associated with a corresponding subscriber;

a second plurality of cable modem circuits that couple to a second cable network, wherein each of the second plurality of cable modem circuits is associated with a corresponding subscriber;

a first plurality of telephones, each having a first POTS (Plain Old Telephone System) interface and being associated with a corresponding subscriber;

a second plurality of telephones, each having a second POTS interface and being associated with a corresponding subscriber;

a first head end system coupled to the first cable network, the public switched telephony network, and the Internet network;

a second head end system coupled to the second cable network, the public switched telephony network, and the Internet network;

wherein the first head end system and the second head end system both support address mapping that enables communication exchanges between one of the first plurality of telephones and one of the second plurality of telephones, and in which a plurality of terminal addresses for a particular subscriber is stored in the address mapping, wherein the first and second head end systems are further operable to receive a location update from the particular subscriber that includes a new network address of an active terminal for the particular subscriber, to store the new network address in the address mapping associated with the particular subscriber and to track the currently active terminal for the particular subscriber by last usage in the address mapping, in which the plurality of terminal addresses for the particular subscriber includes a current Internet (IP) address of a roaming voice over Internet (VoIP) terminal and in which the head end systems track a location and corresponding IP address of the roaming VoIP terminal; and wherein at least one of the head end systems is operable to alert a particular POTS telephone associated with the particular subscriber of an incoming call through the respective first or second cable network, wait for pickup by the particular POTS telephone associated with the particular subscriber, and when the particular POTS telephone picks up, to service the incoming call to terminate to the particular POTS telephone, but when the particular POTS telephone does not pickup, to forward the incoming call to a currently active terminal of the subscriber and when the currently active terminal is the roaming VoIP terminal, to forward the incoming call over the Internet network to the roaming VoIP terminal at the current IP address noted in the address mapping associated with the particular subscriber.

7. The cable infrastructure of claim 6, wherein each of the first and second plurality of cable modem circuits includes a cable network interface at least one POTS interface and a bridging circuit operable to bridge a call between a VoIP format and a POTS format.

8. The cable infrastructure of claim 6, wherein each of the first and second plurality of cable modem circuits has associated therewith at least one public switched telephony network number and at least one IP address.

9. The cable infrastructure of claim 6, wherein at least one of the head end systems is further operable to forward an incoming public switched telephony network call to the roaming VoIP terminal via the Internet to the particular subscriber.

10. The cable infrastructure of claim 6, wherein at least one of the head end systems is further operable to send an alert to the roaming VoIP terminal associated with the particular subscriber when the incoming call to the POTS telephone is received by the head end system.

11. A method for operating a voice over Internet (VoIP) terminal with a cable network, a public switched telephone network and an Internet network, comprising:

receiving a call setup request of an incoming call to a particular subscriber at a head end system coupled to the cable network, public switched telephone network and the Internet network, the call setup request including an identity of a destination terminal located on the cable network having a POTS (Plain Old Telephone System) telephone of the particular subscriber;

mapping the identity of the destination terminal at the head end system to determine that the call setup request targets the POTS telephone on the cable network, the mapping being performed in an address map that includes a plurality of terminal addresses for the particular subscriber, wherein the head end system is further operable to receiving a location update from the particular subscriber that includes a new network address of an active terminal for the particular subscriber, storing the new network address in the address mapping associated with the particular subscriber and tracking the currently active terminal for the particular subscriber by last usage in the address mapping, in which the plurality of terminal addresses for the particular subscriber includes a current Internet (IP) address of a roaming voice over Internet (VoIP) terminal and in which the head end system tracks a location and corresponding IP address of the roaming VoIP terminal;

alerting the POTS telephone on the incoming call;

waiting for pickup by the POTS telephone;

servicing the incoming call to terminate to the POTS telephone when the POTS telephone picks up, but when the POTS telephone does not pickup, forwarding the incoming call to a currently active terminal of the subscriber and when the currently active terminal is the roaming VoIP terminal, to forward the incoming call to the roaming VoIP terminal through the Internet network at the current IP address noted in the address mapping associated with the particular subscriber.

12. The method of claim 11, further comprising associating a public switched telephony network number and at least one IP address for the POTS telephone.

* * * * *